US012299848B2

(12) United States Patent
Gulati et al.

(10) Patent No.: US 12,299,848 B2
(45) Date of Patent: May 13, 2025

(54) DEEP LEARNING IMAGE DENOISING FOR SEMICONDUCTOR-BASED APPLICATIONS

(71) Applicant: KLA Corporation, Milpitas, CA (US)

(72) Inventors: Aditya Gulati, Chandigarh (IN); Raghavan Konuru, Andhra Pradesh (IN); Niveditha Lakshmi Narasimhan, Chennai (IN); Saravanan Paramasivam, Chennai (IN); Martin Plihal, Pleasanton, CA (US); Prasanti Uppaluri, Saratoga, CA (US)

(73) Assignee: KLA Corporation, Milpitas, CA (US)

( * ) Notice: Subject to any disclaimer, the term of this patent is extended or adjusted under 35 U.S.C. 154(b) by 492 days.

(21) Appl. No.: 17/721,300

(22) Filed: Apr. 14, 2022

(65) Prior Publication Data

US 2022/0383456 A1    Dec. 1, 2022

Related U.S. Application Data

(60) Provisional application No. 63/223,976, filed on Jul. 21, 2021.

(30) Foreign Application Priority Data

May 31, 2021  (IN) ............................. 202141024096

(51) Int. Cl.
*G06T 5/70* (2024.01)
*G06T 5/50* (2006.01)
*G06T 7/00* (2017.01)

(52) U.S. Cl.
CPC .................. *G06T 5/70* (2024.01); *G06T 5/50* (2013.01); *G06T 7/001* (2013.01); *G06T 2207/20081* (2013.01); *G06T 2207/20084* (2013.01); *G06T 2207/20224* (2013.01); *G06T 2207/30148* (2013.01)

(58) Field of Classification Search
CPC .. G06T 5/70; G06T 5/50; G06T 7/001; G06T 2207/20081; G06T 2207/20084; G06T 2207/20224; G06T 2207/30148; G06T 5/60; G06N 3/0464

See application file for complete search history.

(56) References Cited

U.S. PATENT DOCUMENTS

| | | |
|---|---|---|
| 8,126,255 B2 | 2/2012 | Bhaskar et al. |
| 8,664,594 B1 | 4/2014 | Jiang et al. |
| 8,692,204 B2 | 4/2014 | Kojima et al. |
| 8,698,093 B1 | 4/2014 | Gubbens et al. |

(Continued)

FOREIGN PATENT DOCUMENTS

KR    10-2020-0086485    7/2020

OTHER PUBLICATIONS

International Search Report for PCT/US2022/031577 mailed Sep. 21, 2022.

*Primary Examiner* — Roy M Punnoose

(74) *Attorney, Agent, or Firm* — Entropy Matters LLC

(57) ABSTRACT

Methods and systems for determining information for a specimen are provided. One system includes a computer subsystem and one or more components executed by the computer subsystem. The one or more components include a deep learning model configured for denoising an image of a specimen generated by an imaging subsystem. The computer subsystem is configured for determining information for the specimen from the denoised image.

18 Claims, 4 Drawing Sheets

(56) References Cited

U.S. PATENT DOCUMENTS

| | | | |
|---|---|---|---|
| 8,716,662 B1 | 5/2014 | MacDonald et al. | |
| 9,222,895 B2 | 12/2015 | Duffy et al. | |
| 9,816,939 B2 | 11/2017 | Duffy et al. | |
| 11,790,492 B1* | 10/2023 | Ahmad | G06N 3/0495 |
| 2020/0065940 A1* | 2/2020 | Tang | G06T 3/40 |
| 2020/0226722 A1 | 7/2020 | Pandey | |
| 2020/0327654 A1 | 10/2020 | Zhang et al. | |
| 2020/0357097 A1* | 11/2020 | Peemen | G06T 5/20 |
| 2021/0012463 A1* | 1/2021 | Ramani | G06T 5/60 |
| 2021/0056305 A1 | 2/2021 | Zhuang et al. | |
| 2021/0104021 A1* | 4/2021 | Sohn | G06T 5/70 |
| 2021/0118125 A1 | 4/2021 | Chen et al. | |
| 2021/0133499 A1* | 5/2021 | Zhang | G06N 3/08 |
| 2022/0044362 A1* | 2/2022 | Sharoukhov | G06T 5/50 |
| 2022/0383456 A1* | 12/2022 | Gulati | G06T 7/001 |
| 2023/0011759 A1* | 1/2023 | Lu | G06T 5/20 |
| 2023/0153950 A1* | 5/2023 | Wang | G06T 5/60 |
| | | | 382/242 |
| 2023/0153951 A1* | 5/2023 | Wang | G06N 3/04 |
| | | | 382/100 |

* cited by examiner

DEEP LEARNING IMAGE DENOISING FOR SEMICONDUCTOR-BASED APPLICATIONS

BACKGROUND OF THE INVENTION

1. Field of the Invention

The present invention generally relates to methods and systems for determining information for a specimen. Certain embodiments relate to a deep learning model configured for denoising an image of a specimen that is used to determine information for the specimen.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

There are many different ways to process images, output, etc. generated by tools configured as described above to determine information therefrom. Often in the case of inspection, a test image is compared to a reference image so that any differences between the test image and the reference image can be identified and used to detect defects on the specimen. Regardless of how the information is determined, mitigating the effects of noise in the images on the information determined can be challenging and much research and development has been performed to overcome the obstacles that image noise presents.

Some currently used defect detection algorithms are designed for reducing noise on tool. For example, some currently used algorithms compute a reference frame using a linear combination of reference frames from multiple dies on a wafer such that the reference image has less noise. Another approach is the use of a difference filter, which is usually a matrix that when convolved with a difference image is expected to improve the signal-to-noise ratio (SNR) of a defect. For cases in which a reticle is printed on a wafer and the wafer is inspected to detect defects on the reticle, dies or reticles from one or two rows may be stacked to reduce random noise and improve the SNR for detecting repeaters. Another method for reducing the impact of noise is using deep learning to learn a filter that is applied post-detection to extract new attributes for nuisance event filtering (NEF).

There are several disadvantages to the noise mitigation strategies described above. For example, the inventors are unaware of any approaches used for reducing noise today that perform denoising on test images. In one such example, the methods that compute a linear combination of similar noisy realizations do that for reference images only. In addition, even after the reference generation described above designed for noise mitigation, there may still be residual noise in the difference images generated with the references. Further noise reduction may be necessary in many cases to achieve the desired accuracy for the determined information. In another example, difference image filters are standard kernels and do not adapt to different noise distributions. It takes special expertise to define custom difference image filters. Furthermore, stacked dies or reticles generated to compare against a golden database reference address specific use cases like reticle inspection performed using a wafer printed with the reticle and cannot be applied to detect non-repeater defects.

Accordingly, it would be advantageous to develop systems and methods for determining information for a specimen that do not have one or more of the disadvantages described above.

SUMMARY OF THE INVENTION

The following description of various embodiments is not to be construed in any way as limiting the subject matter of the appended claims.

One embodiment relates to a system configured to determine information for a specimen. The system includes a computer subsystem and one or more components executed by the computer subsystem. The one or more components include a deep learning model configured for denoising an image of a specimen generated by an imaging subsystem. The computer subsystem is configured for determining information for the specimen from the denoised image. The system may be further configured as described herein.

Another embodiment relates to a computer-implemented method for determining information for a specimen. The method includes denoising an image of a specimen generated by an imaging subsystem by inputting the image into a deep learning model configured for performing the denoising. The deep learning model is included in one or more components executed by a computer subsystem. The method also includes determining information for the specimen from the denoised image. The inputting and determining are performed by the computer subsystem.

Each of the steps of the method may be further performed as described further herein. The method may include any other step(s) of any other method(s) described herein. The method may be performed by any of the systems described herein.

Another embodiment relates to a non-transitory computer-readable medium storing program instructions executable on a computer system for performing a computer-implemented method for determining information for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
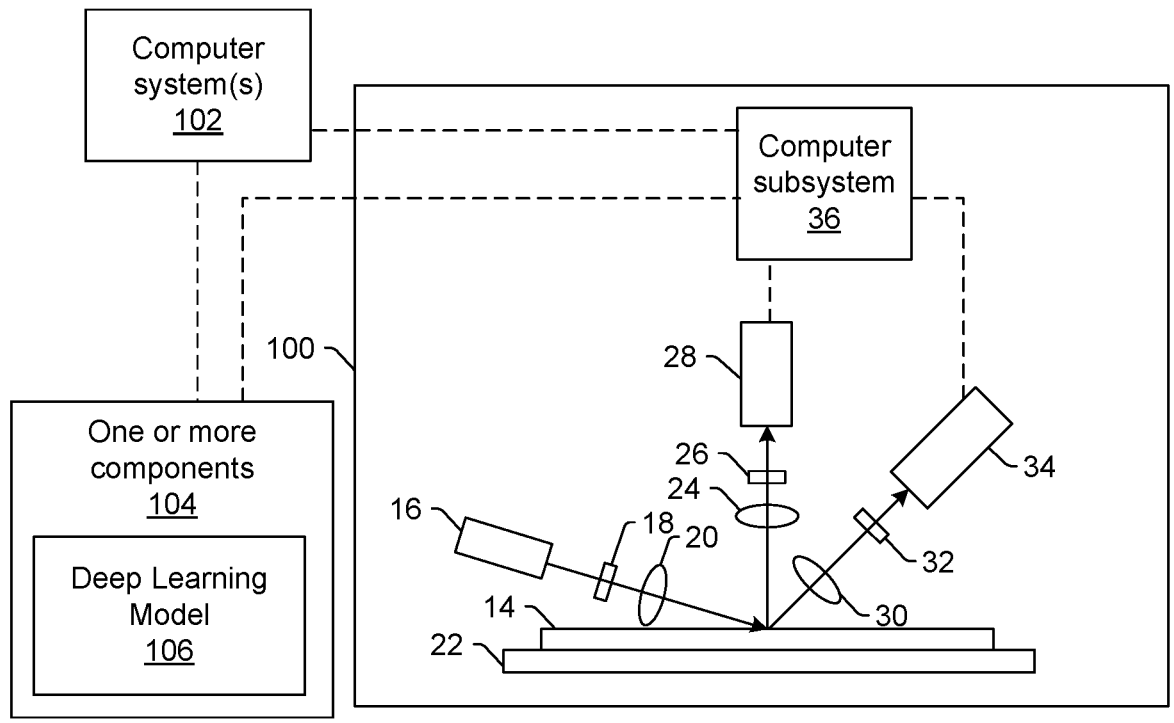
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

"Nuisances" (which is sometimes used interchangeably with "nuisance defects" or "nuisance events") as that term is used herein is generally defined as defects that a user does not care about and/or events that are detected on a specimen but are not really actual defects on the specimen. Nuisances that are not actually defects may be detected as events due to non-defect noise sources on a specimen (e.g., grain in metal lines on the specimen, signals from underlaying layers or materials on the specimen, line edge roughness (LER), relatively small critical dimension (CD) variation in patterned features, thickness variations, etc.) and/or due to marginalities in the inspection system itself or its configuration used for inspection.

The term "defects of interest (DOIs)" as used herein is defined as defects that are detected on a specimen and are actual defects on the specimen. Therefore, the DOIs are of interest to a user because users generally care about how many and what kind of actual defects are on specimens being inspected. In some contexts, the term "DOI" is used to refer to a subset of all of the actual defects on the specimen, which includes only the actual defects that a user cares about. For example, there may be multiple types of DOIs on any given specimen, and one or more of them may be of greater interest to a user than one or more other types. In the context of the embodiments described herein, however, the term "DOIs" is used to refer to any and all real defects on a specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are systems and methods for determining information for a specimen. More specifically, the embodiments described herein are configured for denoising of images for applications such as optical defect detection.

One particular useful application of the embodiments described herein is denoising broadband plasma (BBP) patch images using a convolutional neural network (CNN). BBP tools are the most sensitive optical inspection tools in the fab. Sensitivity to yield critical and gap defects is a primary expectation from tool users and hence motivation for innovation in these tools. With shrinking design nodes and defect sizes, it has become extremely challenging to detect critical DOIs despite using the best optical inspection mode on these tools. Hence, there is a strong need for algorithms to boost sensitivity. In practical terms, sensitivity translates to signal-to-noise ratio (SNR) for given DOI types. Improving SNR can be done either by boosting signal or reducing noise. The embodiments described herein can advantageously be used to reduce noise in BBP (and other) images using a CNN or other deep learning (DL) model described herein and optionally computing new attributes to improve sensitivity.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for determining information for a specimen is shown in FIG. 1. In some embodiments, the system includes an imaging subsystem such as imaging subsystem 100. The imaging subsystem includes and/or is coupled to a computer subsystem, e.g., computer subsystem 36 and/or one or more computer systems 102.

In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected. In one embodiment, as shown in FIG. 1, the imaging subsystem is configured as a light-based imaging subsystem. In this manner, the specimen images described herein may be generated by a light-based imaging subsystem.

In the light-based imaging subsystems described herein, the energy directed to the specimen includes light, and the energy detected from the specimen includes light. For example, in the embodiment of the system shown in FIG. 1, the imaging subsystem includes an illumination subsystem configured to direct light to specimen 14. The illumination subsystem includes at least one light source. For example, as shown in FIG. 1, the illumination subsystem includes light source 16. The illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 1. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a BBP light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrow-band laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the imaging subsystem and to generate output responsive to the detected light. For example, the imaging subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 1 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 1 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

It is noted that FIG. 1 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as the 29xx/39xx series of tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions with or without the output of the detectors including the steps and functions described further herein. As such, the steps described herein may be performed "on-tool," by a computer subsystem that is coupled to or part of an imaging subsystem. In addition, or alternatively, computer system(s) 102 may perform one or more of the steps described herein. Therefore, one or more of the steps described herein may be performed "off-tool," by a computer system that is not directly coupled to an imaging subsystem. Computer subsystem 36 and computer system(s) 102 may be further configured as described herein.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron-based imaging subsystem. In this manner, the specimen images described herein may be generated by an electron-based imaging subsystem. In an electron beam imaging subsystem, the energy directed to the specimen includes electrons, and the energy detected from the specimen includes electrons. In one such embodiment shown in FIG. 1*a*, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 1.

Figure 1A:
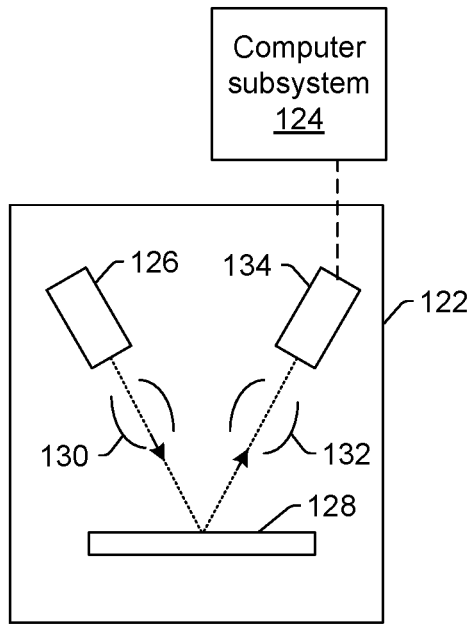

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect events on the specimen using output generated by detector 134, which may be performed as described further herein. Computer subsystem 124 may be configured to perform any additional step(s) described herein. A system that includes the imaging subsystem shown in FIG. 1a may be further configured as described herein.

It is noted that FIG. 1a is provided herein to generally illustrate a configuration of an electron beam imaging subsystem that may be included in the embodiments described herein. As with the optical imaging subsystem described above, the electron beam imaging subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 1a except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" is defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters). In addition, the multiple modes may be different in perspective, meaning having either or both of different angles of incidence and angles of collection, which are achievable as described further above. The imaging subsystem may be configured to scan the specimen with the different modes in the same scan or different scans, e.g., depending on the capability of using multiple modes to scan the specimen at the same time.

In some instances, the systems described herein may be configured as inspection systems. However, the systems described herein may be configured as another type of semiconductor-related quality control type system such as a defect review system and a metrology system. For example, the embodiments of the imaging subsystems described herein and shown in FIGS. 1 and 1a may be modified in one or more parameters to provide different imaging capability depending on the application for which they will be used. In one embodiment, the imaging subsystem is configured as an electron beam defect review subsystem. For example, the imaging subsystem shown in FIG. 1a may be configured to have a higher resolution if it is to be used for defect review or metrology rather than for inspection. In other words, the embodiments of the imaging subsystem shown in FIGS. 1 and 1a describe some general and various configurations for an imaging subsystem that can be tailored in a number of manners that will be obvious to one skilled in the art to produce imaging subsystems having different imaging capabilities that are more or less suitable for different applications.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 1 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

The system includes a computer subsystem, which may include any configuration of any of the computer subsystem(s) or system(s) described above, and one or more components executed by the computer subsystem. For example, as shown in FIG. 1, the system may include computer subsystem 36 and one or more components 104 executed by the computer subsystem. The one or more components may be executed by the computer subsystem as described further herein or in any other suitable manner known in the art. At least part of executing the one or more components may include inputting one or more inputs, such as images, data, etc., into the one or more components. The computer subsystem may be configured to input any images, data, etc. into the one or more components in any suitable manner.

The one or more components include deep learning (DL) model 106 configured for denoising an image of a specimen generated by an imaging subsystem. The image may include any of the images described herein generated by any of the imaging subsystems described herein. Although some embodiments are described herein as denoising an image, the DL models described herein may be used for denoising any number of images of a specimen or specimens generated by an imaging subsystem. The imaging subsystem may include any of the imaging subsystems described herein.

Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep learning based model, there are many layers between the input and output (and the layers are not made of neurons but it can help to think of it that way), allowing the algorithm to use multiple processing layers, composed to of multiple linear and/or non-linear transformations.

The DL model used by the embodiments described herein may be classified as a generative model. A "generative" model can be generally defined as a model that is probabilistic in nature. In other words, a "generative" model is not one that performs forward simulation or rule-based approaches. Instead, the generative model can be learned (in that its parameters can be learned) based on a suitable training set of data. In one embodiment, the DL model is configured as a deep generative model. For example, the DL model may be configured to have a DL architecture in that the DL model may include multiple layers, which perform a number of algorithms or transformations.

In one embodiment, the DL model is configured as a convolutional neural network (CNN). A CNN usually includes stacks of convolution and pooling layers, to extract local features. The convolutional layer(s) may have any suitable configuration known in the art and are generally configured to determine features for an image as a function of position across the image (i.e., a feature map) by applying a convolution function to the input image using one or more filters. The one or more pooling layers may also have any suitable configuration known in the art (e.g., max pooling layers) and are generally configured for reducing the dimensionality of the feature map generated by the one or more convolutional layers while retaining the most important features. The DL model may have any suitable CNN configuration or architecture known in the art.

"Denoising" as that term is used herein does not refer to any noise reduction that may happen by transforming an image for other purposes such as transforming an image from one space (or image type) to another or transforming an image by changing a resolution of the image. In other words, the "denoising" described herein is not intended to alter any characteristics of the image other than the noise characteristics of the image. Denoising does not transform any image from one relatively noisy type of image like a specimen image to a relatively quiet type of image like a design image, which requires a change in the image type. Denoising also does not transform any image from a low resolution image to a high resolution image, which requires a change in at least one image characteristic (resolution) other than noise. In this manner, although some image transformation algorithms or methods, which may or may not be DL based, may generate an image that may be considered to be less noisy than the original image, those image transformation algorithms and methods do not retain all of the original image characteristics other than noise. In one such example, an image that is denoised by the embodiments described herein may be an optical inspection image generated by a BBP tool having one resolution and pixel size, and the resulting denoised image may also be an optical inspection image having the same resolution and pixel size but with less noise than the original image.

While image transformations such as those described above (e.g., changing an image from one type to another or one resolution to another) may be useful for many applications, such transformations are not the goal of the denoising described herein. On the other hand, it is important to note that there is no reason why the denoising described herein cannot be combined with other such image transformations. For example, an image that is denoised as described herein, when input to a model that transforms that denoised image to a different type of image or an image with a different resolution may provide a better quality transformed image than if the original image was input to the transformation. In this manner, the denoising performed as described herein may be performed upstream of other image transformation processes, with the denoised images used as input for those processes. The denoising and information determination steps described herein may also be used in different ways with other image transformation steps. For example, the denoised images described herein may be used for nuisance filtering, and then other image transformations may be performed for the defects remaining after the nuisance filtering using either the denoised or original images. In this manner, the denoising and information determining steps described herein may be integrated into an inspection or other quality control type process in a variety of ways.

The embodiments described herein may have two steps: training and inference. In one embodiment, the computer subsystem is configured for training the DL model with a training set that includes multiple noisy realizations of the same image and a mean to loss function. For example, training may be done using a CNN model on sampled data from BBP hot scan of Layer A, i.e., the specimen layer that will be inspected. Training may be done by mapping multiple noisy realizations of the same image in a CNN network. Test and reference images (which are similar to the test image) may be used as noisy realizations of the same image. These images can be with or without defect detection. In other words, these images may be images in which a defect was detected via a defect detection algorithm or images in which it is not known if a defect is present because defect detection has not been performed on the images. In general, two or more (e.g., three) images generated at two or more (e.g., three) instances of the same design location on a specimen may be used as the training inputs, and the training output for each of these images may be generated from the input images, e.g., via perturbation, averaging, or some other image noise reduction technique known to have sufficient image noise reduction capability. In this manner, the training output, or denoised version of the training inputs, may be generated from the training inputs using a method that is known for providing at least some noise reduction capability. When used with a mean loss function, the CNN model converges to a mean behavior thus learning a denoising function.

Relatively low signal events of appropriate sample size may also be sampled from across the specimen for the purpose of training. "Relatively low signal events" in this context can be generally defined as images that are mostly noise instead of predominantly defects. In other words, the images are predominantly made up of relatively low signal noise rather than images dominated by what can be much larger defect signals. This sampling may be performed in a variety of ways including by the computer subsystem described herein using a filtering or sampling method based on the signals in the images.

Figure 2:
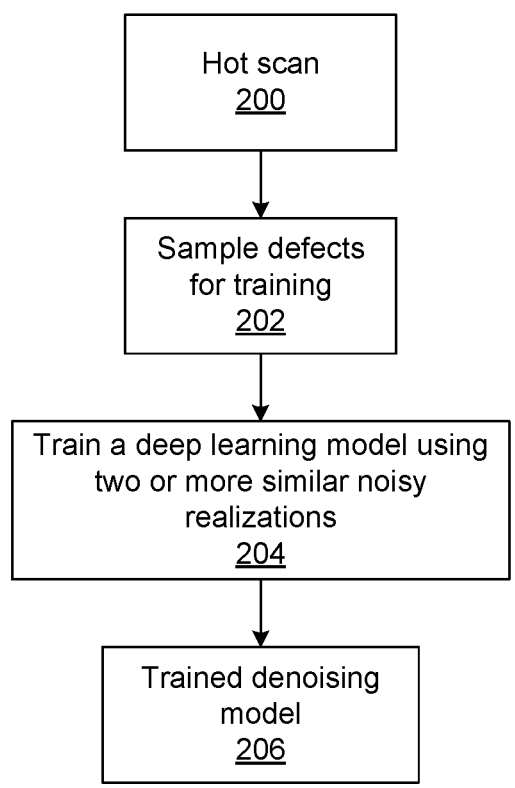
FIG. 2 is a flow chart illustrating steps that may be performed by the embodiments described herein for training a deep learning model.

FIG. 2 shows one embodiment of steps that may be performed in a training flow. As shown in step 200, the system may perform a hot scan of a specimen. In general, a hot scan involves scanning a specimen and then applying a hot threshold to output generated during the scanning. The hot threshold is referred to in this way because it is at, near, or even within the noise floor of the scanning output. In this manner, a hot scan will detect many events, most of which may not be defects but are instead noise or nuisance. Therefore, hot scans are generally not performed for production purposes in which the process is well understood and only certain known types of defects are of interest. Instead, hot scans are often used to discover what kinds of defects are on a layer and/or to generate a significant amount of data that can be used to setup an inspection process. In this case, a hot scan may generate many images that are relatively noisy and are therefore suitable for training the DL models described herein. In addition, many of the images saved by a hot scan may not be images in which the defect signal is relatively strong (since events detected by such a hot scan may include many relatively low signal events). Such images, that may contain a defect but typically a low signal one, may be particularly suitable for the training described herein.

Although a hot scan is one particularly easy and advantageous way to generate the training images for the embodiments described herein, it is also not necessarily required. For example, if enough suitable images (images largely composed of noise) are generated via a production type scan, that scan may be used to generate the training images for the denoising DL model. In addition, the embodiments described herein do not necessarily have to generate the training images, but may acquire them from a storage medium in which they were previously stored by the imaging subsystem or a different system or method. Furthermore, the training images do not necessarily have to be images on which detection was performed prior to use for training. Moreover, it may be preferable that the training images are generated using the same imaging subsystem parameters that will be used for the process in which the denoised images will be generated and then used to determine information for the specimen, but that is also not necessary.

The training images may also be generated using the specimen for which the information will be determined using images denoised by the trained DL model, but as described further herein, a denoising DL model that is trained for one specimen having one layer formed thereon may also in some instances be used for denoising images of a different specimen that may or may not have the same layer formed thereon. In this manner, the training images may or may not be generated by scanning a physical specimen whose images will be denoised by the DL model.

It may also be possible to generate at least some of the images used for training without an imaging subsystem. For example, actual images generated by scanning a specimen with an imaging subsystem may be used to generate artificial images that can be used for training with or instead of the actual images. Generating the artificial images may include perturbing the actual images or modifying them with a filter, function, etc. to add artificial or different noise to the images or to change other noise characteristics of the actual images. In this manner, although a hot scan may be a quick, easy, and reliable way to generate training images for the denoising DL models described herein, a hot scan is by no means the only way that the training set may be generated.

As shown in step 202, the computer subsystem may sample defects detected by the hot scan performed in step 200 for training. The number of defects that are sampled for training may vary greatly and may depend on the configuration of the DL model and the number of training samples generally needed to train it. The sampled defect images may also be split into different subsets used for different phases of the training such as training, testing, and validation. Generally, training a DL model requires a significant number of training samples, and one advantage of using a hot scan to generate the training images is that the hot scan is almost guaranteed to generate a sufficient number of samples that can be used for training.

As described above, multiple noisy realizations of the same image are preferably used for training. In this manner, the training sample may include multiple images generated at corresponding locations on the specimen such as the same location in multiple dies, fields, etc. on the specimen. "Multiple noisy realizations of the same image" as that term is used herein is generally defined as at least two images generated at (or for) multiple locations on a specimen at which the same design portion is printed, i.e., corresponding design coordinates, and which are "noisy" in that they represent the images that would be generated in a process performed on the specimen prior to any denoising type function performed thereon. In this manner, the multiple noisy realizations of the same image may be generated in a hot scan of a specimen or a normal production scan of a specimen. The multiple noisy realizations may also include one or more test images and/or one or more reference images, where the test images and reference images are defined by the process performed on the specimen using the images, whether that is a die-to-die type inspection where test and reference images are from different adjacent dies on the specimen or another type of inspection or quality control type process described herein.

Although the training may be performed using multiple noisy realizations of the same image, that does not mean that training can only be performed for one image of the specimen. For example, the training may be performed with multiple noisy realizations of a first image generated at first design coordinates, multiple noisy realizations of a second image generated at second design coordinates, etc. In this manner, the DL model may learn to denoise images generated at different locations in the design for the specimen.

As shown in step 204, the computer subsystem may train the DL model using two or more similar noisy realizations, which may be performed as described further herein. In this step, the computer subsystem trains the DL model to learn the denoising function that will then be applied to other images, which may include images for the same specimen and optionally images for other specimens, which as described further herein may or may not be of the same type. The result of the training performed in step 204 is therefore trained denoising model 206, which may then be used by the computer subsystem to denoise images as described above. In other words, after the training is done using the multiple similar noisy realizations of the same image, the computer subsystem may input other specimen images into the DL model, which will denoise those input images, which can be used to determine information as described further herein.

The DL model may or may not be trained by the computer subsystem and/or one of the component(s) executed by the computer subsystem. For example, another method or system may train the DL model, which then may be stored for use as the component(s) executed by the computer subsystem. In either case, the training may include inputting the training inputs into the DL model and altering one or more parameters of the DL model until the DL model converges to a mean behavior. Training may include altering any one or more trainable parameters of the DL model. The one or more parameters of the DL model that are trained may include one or more weights for any layer of the DL model that has trainable weights. In one such example, the weights may include weights for convolution layers but not pooling layers.

Once a model is trained as described above, it can be applied on the rest of the defects of the layer on the specimen for which the images were generated or images generated by a hot scan of a different specimen of the same layer. In other words, once the denoising model is trained, it can be used not just for the specimen whose images were used to train the model, but also for other specimens on which the same layer has been formed and is imaged by the imaging subsystem. In one such embodiment, the multiple noisy realizations of the same image are generated for an additional specimen, and the specimen and the additional specimen have different layers formed thereon. For example, preliminary data generated by the inventors supports the possibility that a model trained on images of a specimen having, say, layer A formed thereon can also work on, i.e., sufficiently denoise, images of a specimen having, say, layer B formed thereon. In other words, even if the designs for two specimens are different so that layers A and B are different, there may be enough similarities between the designs and layers such as materials and dimensions of patterned features formed on layers A and B that a denoising model trained on images of layer A can be used for denoising images of layer B. In addition, based on preliminary results generated by the inventors, a denoising model trained on one-layer data showed improved sensitivity when applied to a different layer data without any additional training. Using a denoising model from one layer to another layer for any algorithm is believed to the first of its kind in optical inspection such as BBP inspection. Even if it turns out that a denoising model trained for one layer cannot sufficiently denoise images for another layer, a denoising model that is trained for layer A may be used as an initial DL model configuration that is retrained for layer B in a kind of mother network or transfer learning use.

In another embodiment, the image is a test image in which a defect was detected prior to the denoising. In this manner, the embodiments may denoise images post-detection. In contrast, in the flow currently used by inspection tools, there is no step post-detection to denoise the images. In one such embodiment, the defect was detected by a hot scan of the specimen, which may be performed as described above. Denoising images in which defects were detected in a hot scan of a specimen may be particularly useful for a number of reasons. For example, a hot scan typically generates an incredibly large number of detected defects for reasons described above (i.e., the substantially low threshold used for detection). Therefore, the defect population generated by a hot scan in most instances has to be processed to filter out non-defects (nuisance or noise) from actual defects (for defect discovery or inspection process setup). By inputting the images in which a defect was detected by such a scan into a denoising DL model described herein, the denoised images generated by the DL model may generate much more useful images for separating defects from noise or nuisance or determining additional information for the detected defects, which may be performed as described further herein. Although the images that are denoised by the embodiments described herein may include images in which a defect was detected by a hot scan, this is not a requirement. For example, any images in which a defect was detected, regardless of how the defect was detected, may be input to the DL model described herein for denoising.

Figure 3:
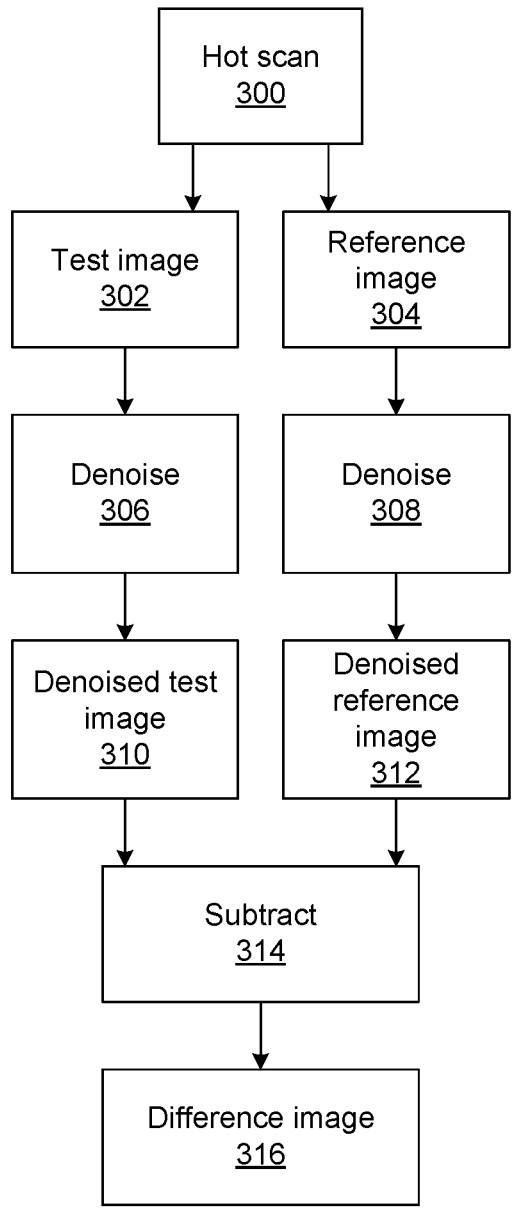
FIG. 3 is a flow chart illustrating steps that may be performed by the embodiments described herein for generating denoised images.

FIG. 3 shows one embodiment of steps that may be performed by the embodiments described herein in an inference flow. In this embodiment, the system may perform a hot scan, as shown in step 300, but the inference flow shown in this figure may be performed for any images generated in any type of specimen scan. The output of the hot scan may include test images and reference images shown in FIG. 3 as test image 302 and reference image 304, respectively. The test images and the reference images may both be input to a denoising (inference) step. For example, as shown in FIG. 3, test image 302 may be input to denoise step 306, and reference image 304 may be input to denoise step 308. Although the test and reference image denoising are shown in FIG. 3 as different steps, these steps may be performed by the same DL model configured as described herein. The test and reference images may be input to the DL model simultaneously, as in multiple channels of input, or sequentially on an image-by-image basis depending on the configuration of the DL model. The output of denoising step 306 is denoised test image 310, and the output of denoising step 308 is denoised reference image 312. The computer subsystem may then subtract the denoised reference image from the denoised test image as shown in step 314 thereby generating a denoised difference image 316. In this manner, in some embodiments, the output generated by inference is a hot scan with denoised test, reference, and difference images.

As shown in FIG. 3, the denoised difference image may be generated by subtracting a denoised reference image from a denoised test image. In some instances, it may also or alternatively be suitable for inputting a difference image generated by subtracting a non-denoised reference image from a non-denoised test image into the DL model for denoising. In other words, a difference image generated from the original images may also or alternatively be input to the denoising DL model and used for determining information as described herein.

In some embodiments, the computer subsystem is configured for detecting defects on the specimen based on test images of the specimen generated by the imaging subsystem and for inputting the test images into the DL model for the denoising, and the test images that are input to the DL model by the computer subsystem include only the test images in which one or more of the defects were detected. In this manner, the images that are input to the DL model for denoising may not include all of the images generated by a scan. Instead, the images that are denoised may include only the test images in which at least one defect was detected. In such instances, the images that are denoised may also include the reference and (possibly) difference images for those test images, but not the reference or difference images for any test images in which a defect was not detected. By performing the denoising after defect detection, the number of images that are denoised can be reduced, perhaps significantly, which can reduce the computation time and expense of the denoising. The steps of this embodiment may otherwise be performed as described herein.

In a further embodiment, the denoising is performed prior to defect detection performed using the image. For example, in contrast to some embodiments described herein that denoise patch images post-detection, denoising using the embodiments described herein can be done on frame data prior to detection. In this manner, the denoising may be performed by inputting the images (and perhaps all of the images) generated by a scan of a specimen into a DL model configured as described herein. It is also noted that although the inference denoising may be performed at different times (pre-detection or post-detection), these are not mutually exclusive. In one such example, it is possible to denoise images both before and after defect detection, which may be advantageous in some instances depending on whether the additional computation time/expense is deemed worthwhile.

In some embodiments, the image is a test image of the specimen, and the DL model is configured for denoising a reference corresponding to the test image. For example, as shown in FIG. 3, both test and reference images may be input to a denoising step. These images may then be used to generate a denoised difference image as shown in FIG. 3 and/or used in any other manner described herein. The inventors believe that the embodiments described herein are the first known approach to denoise both test and reference images. For example, there are a variety of currently used ways to denoise a reference image, typically created for the purpose of (or as a byproduct of) trying to generate the best reference for defect detection. However, generally, the test images are not denoised especially not prior to defect detection due to the fear of inadvertently reducing or eliminating defect signals, which can result in missed defects and inaccurate inspection results. Therefore, one new feature of the embodiments described herein is believed to be that they provide a method or algorithm to denoise test images generated by optical inspection tools. For example, some currently used approaches compute a reference image using a linear combination of images similar to the test image thereby generating a reference image that has less noise than each of the images that are linearly combined. In contrast, the embodiments described herein propose a solution using deep learning that is capable of learning non-linear relationships. Therefore, the embodiments described herein may generate better denoised images for both test and reference images.

In one such embodiment, the reference is an additional image of the specimen generated by the imaging subsystem at a location on the specimen corresponding to a location on the specimen at which the test image was generated. For example, in many inspection processes, a test image is compared to another image generated at a corresponding position on the specimen. The other image may then serve as a reference image in inspection such as die-to-die inspection, cell-to-cell inspection, etc. Unlike other reference images that are not generated from the specimen, e.g., a reference generated from a database, reference images generated from a specimen may have many of the same noise characteristics as the test image or may contain enough noise that unless denoised could cause problems for detection. This is why many different ways for generating a reference image have been created. Oftentimes, such currently used reference image creation requires images acquired at multiple instances of the same design location on the specimen. Needing multiple images for reference image creation obviously can cause problems like increased time for image acquisition, computation time for generating the reference, reference storage and reusability concerns, and reference image quality concerns due to things like image alignment inaccuracies, specimen variations, etc.

Unlike these currently used methods, the embodiments described herein can advantageously generate a suitable reference image from only a single image acquired at a location corresponding to the location at which the test image was generated. For example, an image from an adjacent die, cell, etc. to the one in which a test image was generated can be input to the DL model described herein, which when properly trained can produce a reference image that is substantially noise free. The embodiments described herein may therefore be capable of generating suitable reference images for inspection and other quality control type processes much quicker and faster than currently used methods and systems. In addition, because the DL models described herein can be trained to reduce any and all types of noise regardless of its characteristics (linear, nonlinear, etc.), the embodiments described herein may be capable of generating significantly noise free reference images regardless of the noise characteristics of the original image thereby providing potentially more flexibility and robustness than currently used methods and systems for reference image generation.

The computer subsystem is configured for determining information for the specimen from the denoised image. The information determined and the manner in which the denoised image(s) are used for information determination may vary depending on the process being performed on the specimen. The determining information step may be performed by the computer subsystem using an algorithm, which may be part of the one or more components executed by the computer subsystem or may be separate from those components.

In another such embodiment, determining the information includes subtracting the denoised reference from the denoised test image thereby generating a difference image and detecting defects on the specimen based on the difference image. In this manner, defect detection may be performed based on difference images generated as shown in FIG. 3 from corresponding denoised test and reference images. Such defect detection may therefore not be performed until after the test and reference images have been denoised. As such, in this embodiment, the denoising may be performed prior to defect detection and for images that have not yet been examined for defects. Performing defect detection on the denoised images may be more computationally intensive than if denoising is performed after defect detection (where denoising is performed only for images in which at least one defect has been detected). However, in some ways that computation may be offset because the defect population detected using denoised images may be much smaller than the defect population that would be detected using the pre-denoised images. For example, if the defect detection is performed on denoised images rather than the original images, the detected defect population that is input to other steps such as nuisance filtering and attribute extraction (both of which may be performed as described herein) may be much smaller making those steps less computationally intensive.

In general, the denoised images may be used for defect detection in the same manner as any other images. In other words, the denoised images are not defect detection algorithm or method specific, and detecting the defects using the denoised images may be performed using any suitable defect detection algorithm or method known in the art. In one such example, the defect detection may include generating the difference image as described above and applying a threshold to the difference image. Any pixels in the difference image having a value above the threshold may be identified as a defect, and all other pixels may not be identified as a defect. Of course, this is possibly the most simple way in which defect detection can be performed and is included herein as merely a non-limiting example.

In some embodiments, therefore, the information determined for the specimen may include information for defects detected on the specimen. In such instances, the information may include, for example, a type of defect detected, a position of a detected defect with respect to one or more of the specimen image, the specimen, the imaging subsystem, and a design for the specimen, and any other information generated for the defect by the defect detection method or algorithm. Such information may be output and/or stored by the computer subsystem as described further herein.

In a further such embodiment, a defect was detected in the test image prior to the denoising, and determining the information includes subtracting the denoised reference from the denoised test image thereby generating a difference image and determining information for the defect based on the difference image. For example, even if defect detection has already been performed based on non-denoised images, denoised test and reference images may be generated as shown in FIG. 3 and used to generate a difference image. This denoised difference image may then be used for determining information for the defect such as whether the defect is a nuisance or an actual defect, one or more attributes of the defect, etc., which may be performed as described further herein. In this manner, non-denoised difference images may be used for defect detection and then denoised difference images may be used for additional defect functions like filtering, classification, attribute extraction, etc. Denoised difference images may also be used in these ways when defect detection is performed using the denoised difference images.

In another embodiment, the information determined for the specimen includes one or more attributes of a defect detected in the image or the denoised image. For example, post inference (denoising), a predetermined set of attributes may be calculated from at least one (or all) of the denoised test, reference, and difference images. In current inspection defect detection flows, each of training, inference, and attribute calculation can happen either post-detection or offline on tool or analysis station. In other words, training the DL model for denoising, performing the denoising, and calculating attributes from at least one of the denoised images may each be performed pre- or post-detection and on tool or off tool. All three steps can happen together or separately in the aforementioned sequential order. The embodiments described herein may therefore compute attributes on the denoised images which can have improved signal-to-noise ratio (SNR). The defect attributes may include any suitable defect attributes, e.g., classification, size, shape, etc., (other than reported defect location) that can be determined from one or more of the denoised images described herein and/or its alignment to other information for the specimen such as design data. The defect attributes may be determined by the computer subsystem using any suitable method or algorithm known in the art. These attributes can be written to the lot result and can add to or overwrite existing attributes.

Figure 4:
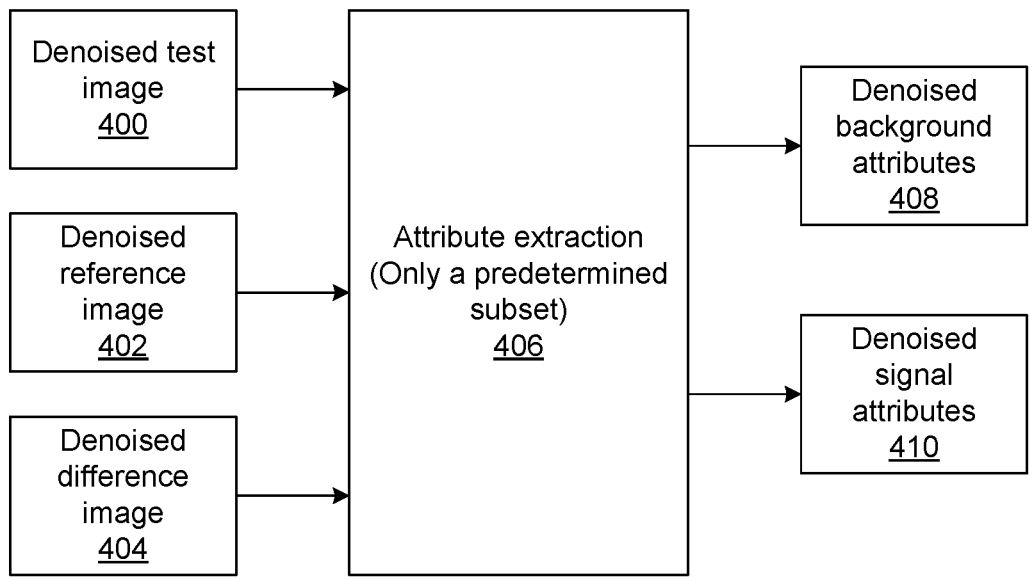
FIG. 4 is a flow chart illustrating steps that may be performed by the embodiments described herein for determining information for a specimen from one or more denoised images.

In some embodiments, a defect is detected in the image or the denoised image, and determining the information for the specimen includes determining a first portion of attributes of the defect from the denoised image and determining a second portion of the attributes of the defect from the image. In other words, as shown in FIG. 4 described further below, the attribute extraction or calculation step performed for any one or more defects detected on a specimen may calculate only a predetermined subset of all of the determined defect attributes from the denoised image(s), which may include any of the denoised images generated for any one defect. For example, some defect attributes may be relatively insensitive to noise, meaning that the noise present in an image does not adversely affect the accuracy of those defect attributes determined from the image or that attribute calculation performed on different instances of the same image but with different noise characteristics would produce the same attribute result. However, other defect attributes may be more sensitive to noise, meaning that the determination of those defect attributes changes with differences in noise in the images. Therefore, depending on how sensitive a defect attribute is to noise, the computer subsystem or a user may select which image(s), denoised or not, are used to determine that defect attribute. Hence, the proposed flow for defect attribute extraction from denoised images described further herein may be performed in tandem to the current flow of attribute extraction after detection performed using the original images.

FIG. 4 shows one embodiment of steps that may be performed for attribute calculation. In this flow, denoised test image 400, denoised reference image 402, and denoised difference image 404, all of which may be generated as described herein, may be input to attribute extraction step 406, in which only a predetermined subset of all of the possible defect attributes are calculated. The predetermined subset of the defect attributes may include only those attributes that can be affected by image noise. Other defect attributes may be calculated from the non-denoised images as they normally would be. The results of this step may include denoised background attributes 408 and denoised signal attributes 410, which may be any background or signal attributes of interest, including any of those that are determined in currently used inspection processes, that can be determined from the denoised images.

Although FIG. 4 shows that the denoised test, reference, and difference images are input to the attribute extraction step for any one defect detected on a specimen, not all of these images need to be input. For example, only the denoised test images or only the denoised difference images may be input to the attribute extraction step. In other instances, particularly when the attribute extraction step includes determining more than one defect attribute, and each attribute determination may require different input images, inputting all of the available images to the attribute extraction step shown in FIG. 4 may be most convenient.

In an additional embodiment, determining the information for the specimen includes determining if a defect detected in the image is a nuisance. Determining if a defect detected in the image is a nuisance may be performed using any of the attributes determined and/or denoised images generated as described herein. For example, the attributes determined as described herein from any of the denoised images (possibly in combination with attributes determined from the original images) may be input to a nuisance event filter (NEF) in the same manner as any other defect attributes. In this manner, any of the attributes determined as described herein may be used with any currently used NEF. Preliminary studies performed by the inventors showed improved nuisance suppression when nuisance filtering is performed using the attributes determined as described herein compared to attributes determined from only images that have not been denoised as described herein. In addition, preliminary data shows that the embodiments described herein are better at nuisance suppression than existing algorithms.

In general, determining the information may include generating one or more inspection-like results for the specimen. Essentially, therefore, the determining information step may have multiple output channels, each for a different type of information. The outputs from multiple channels may then be combined into a single inspection results file (e.g., a KLARF file generated by some KLA inspection tools) for the specimen. In this manner, for any one location on the specimen, there may be multiple types of information in the inspection results file.

Although FIGS. 2-4 describe and show steps that may be performed for an inspection application, these same steps may be performed in a similar manner for other applications described herein like metrology and defect review. In such instances, the input images may be different from those shown in FIGS. 2-4 and may be replaced with suitable images generated by another imaging subsystem such as that included in a metrology or defect review tool. In addition, the information determined from the denoised images may be different and may vary depending on the process being performed on the specimen. For example, instead of determining defect attributes as shown in FIG. 4, the computer subsystem may be configured to perform metrology (like patterned structure attribute calculation) or a step used to perform metrology (like patterned structure identification) from the denoised test image.

In general, even though metrology and defect review tools generate images that are much less noisy than images generated by inspection tools, there may be instances in which metrology and defect review processes generate images that are noisier than usual, e.g., due to unexpected specimen variations or drift in the tool. In this manner, even though the denoising described herein may not be commonly used for such processes, it can be used as a backup method when images are noisier than expected and even to facilitate understanding of why the images are noisier than usual, e.g., via examination of the subsequently denoised images.

Unlike inspection processes, a defect review process generally revisits discrete locations on a specimen at which a defect has been detected. An imaging subsystem configured for defect review may generate specimen images as described herein, which may be input to the DL model as described herein for denoising. The DL model may be trained and configured for image denoising as described further herein. For defect review applications, the computer subsystem may also be configured for using any suitable defect review method or algorithm used on any suitable defect review tool to determine information for the defect or the specimen from the denoised image(s), possibly in combination with any other information determined by the defect review process or from the denoised image(s). While the various inputs and outputs may be different for defect review use cases compared to inspection, the same DL model may be used for both defect review and inspection (after application-appropriate training). The DL model may otherwise be trained and configured as described above.

As described above, in some embodiments, the imaging subsystem may be configured for metrology of the specimen. In one such embodiment, determining the information includes determining one or more characteristics of a specimen structure in an input image. For example, the DL model described herein may be configured for denoising an image of a specimen generated by a metrology tool that can then be used to determine metrology information for the specimen. The metrology information may include any metrology information of interest, which may vary depending on the structures on the specimen. Examples of such metrology information include, but are not limited to, critical dimensions (CDs) such as line width and other dimensions of the specimen structures. The specimen images may include any images generated by any metrology tool, which may have a configuration such as that described herein or any other suitable configuration known in the art. In this manner, the embodiments described herein may advantageously use a specimen image generated by a metrology tool and denoised as described herein for predicting metrology information for the specimen and any one or more specimen structures included in the specimen image. For metrology applications, the computer subsystem may also be configured for using any suitable metrology method or algorithm used on any suitable metrology tool to determine information for the specimen from the denoised image(s), possibly in combination with any other information determined by the metrology process or from the denoised image(s). While the various inputs and outputs may be different for metrology use cases compared to inspection, the same DL model may be used for both metrology and inspection (after application-appropriate training). The DL model may otherwise be trained and configured as described above.

The computer subsystem may also be configured for generating results that include the determined information, which may include any of the results or information described herein. The results of determining the information may be generated by the computer subsystem in any suitable manner. All of the embodiments described herein may be configured for storing results of one or more steps of the embodiments in a computer-readable storage medium. The results may include any of the results described herein and may be stored in any manner known in the art. The results that include the determined information may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem may include information for any defects detected on the specimen such as location, etc., of the bounding boxes of the detected defects, detection scores, information about defect classifications such as class labels or IDs, any defect attributes determined from any of the images, etc., predicted specimen structure measurements, dimensions, shapes, etc. or any such suitable information known in the art. That information may be used by the computer subsystem or another system or method for performing additional functions for the specimen and/or the detected defects such as sampling the defects for defect review or other analysis, determining a root cause of the defects, etc.

Such functions also include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the determined information. The changes to the process may include any suitable changes to one or more parameters of the process. In one such example, the computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of each of the systems described above may be combined together into one single embodiment.

Another embodiment relates to a computer-implemented method for determining information for a specimen. The method includes denoising an image of a specimen generated by an imaging subsystem by inputting the image into a DL model configured for performing the denoising. The DL model is included in one or more components executed by a computer subsystem. The method also includes determining information for the specimen from the denoised image. The inputting and determining steps are performed by the computer subsystem.

Each of the steps of the method may be performed as described further herein. The method may also include any other step(s) that can be performed by the system, computer subsystem, component(s), and/or DL models described herein. The computer subsystem may be configured according to any of the embodiments described herein, e.g., computer subsystem 36. The one or more components and the DL model may also be configured according to any of the embodiments described herein. The method may be performed by any of the system embodiments described herein.

Figure 5:
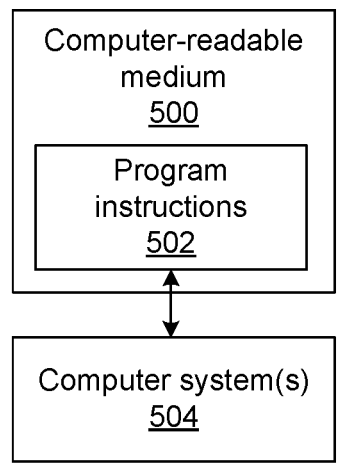
FIG. 5 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for determining information for a specimen. One such embodiment is shown in FIG. 5. In particular, as shown in FIG. 5, non-transitory computer-readable medium 500 includes program instructions 502 executable on computer system(s) 504. The computer-implemented method may include any step(s) of any method(s) described herein.

Program instructions 502 implementing methods such as those described herein may be stored on computer-readable medium 500. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 504 may be configured according to any of the embodiments described herein.

Further modifications and alternative embodiments of various aspects of the invention will be apparent to those skilled in the art in view of this description. For example, methods and systems for determining information for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine information for a specimen, comprising:
   a computer subsystem; and
   one or more components executed by the computer subsystem;

wherein the one or more components comprise a deep learning model configured for denoising an image of a specimen generated by an imaging subsystem; and wherein the computer subsystem is configured for determining information for the specimen from the denoised image, wherein a defect is detected in the image or the denoised image, and wherein determining the information for the specimen comprises determining only a first portion of attributes of the defect from the denoised image, determining only a second portion of the attributes of the defect from the image, and determining information for the defect from the first and second portions of the attributes.

2. The system of claim 1, wherein the deep learning model is further configured as a convolutional neural network.

3. The system of claim 1, wherein the image is a test image in which the defect was detected prior to the denoising.

4. The system of claim 3, wherein the defect was detected by a hot scan of the specimen.

5. The system of claim 1, wherein the denoising is performed prior to defect detection performed using the image.

6. The system of claim 1, wherein the image is a test image of the specimen, and wherein the deep learning model is further configured for denoising a reference corresponding to the test image.

7. The system of claim 6, wherein the reference is an additional image of the specimen generated by the imaging subsystem at a location on the specimen corresponding to a location on the specimen at which the test image was generated.

8. The system of claim 6, wherein determining the information for the specimen further comprises subtracting the denoised reference from the denoised test image thereby generating a difference image and detecting defects on the specimen based on the difference image.

9. The system of claim 6, wherein the defect was detected in the test image prior to the denoising, and wherein determining the information for the defect further comprises subtracting the denoised reference from the denoised test image thereby generating a difference image and determining additional information for the defect based on the difference image.

10. The system of claim 1, wherein the computer subsystem is further configured for detecting defects on the specimen based on test images of the specimen generated by the imaging subsystem and for inputting the test images into the deep learning model for the denoising, and wherein the test images that are input to the deep learning model by the computer subsystem comprise only the test images in which one or more of the defects were detected.

11. The system of claim 1, wherein determining the information for the defect comprises determining if the defect is a nuisance.

12. The system of claim 1, wherein the computer subsystem is further configured for training the deep learning model with a training set comprising multiple noisy realizations of the same image and a mean loss function.

13. The system of claim 12, wherein the multiple noisy realizations of the same image are generated for an additional specimen, and wherein the specimen and the additional specimen have different layers formed thereon.

14. The system of claim 1, wherein the imaging subsystem is a light-based imaging subsystem.

15. The system of claim 1, wherein the imaging subsystem is an electron-based imaging subsystem.

16. The system of claim 1, wherein the specimen is a wafer.

17. A non-transitory computer-readable medium, storing program instructions executable on a computer system for performing a computer-implemented method for determining information for a specimen, wherein the computer-implemented method comprises:

denoising an image of a specimen generated by an imaging subsystem by inputting the image into a deep learning model configured for performing the denoising, wherein the deep learning model is included in one or more components executed by the computer system; and determining information for the specimen from the denoised image, wherein a defect is detected in the image or the denoised image, and wherein determining the information for the specimen comprises determining only a first portion of attributes of the defect from the denoised image, determining only a second portion of the attributes of the defect from the image, and determining information for the defect from the first and second portions of the attributes.

18. A computer-implemented method for determining information for a specimen, comprising:

denoising an image of a specimen generated by an imaging subsystem by inputting the image into a deep learning model configured for performing the denoising, wherein the deep learning model is included in one or more components executed by a computer subsystem; and determining information for the specimen from the denoised image, wherein said inputting and determining are performed by the computer subsystem, wherein a defect is detected in the image or the denoised image, and wherein determining the information for the specimen comprises determining only a first portion of attributes of the defect from the denoised image, determining only a second portion of the attributes of the defect from the image, and determining information for the defect from the first and second portions of the attributes.

* * * * *